United States Patent
Kim et al.

(10) Patent No.: US 9,419,261 B2
(45) Date of Patent: Aug. 16, 2016

(54) BATTERY PACK

(71) Applicant: Samsung SDI Co., Ltd., Yongin-si, Gyeonggi-do (KR)

(72) Inventors: Myung-Chul Kim, Yongin-si (KR);
Hee-Joon Jin, Yongin-si (KR);
Jang-Gun Ahn, Yongin-si (KR);
Young-Bin Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 34 days.

(21) Appl. No.: 14/188,618

(22) Filed: Feb. 24, 2014

(65) Prior Publication Data
US 2014/0315069 A1  Oct. 23, 2014

(30) Foreign Application Priority Data
Apr. 23, 2013  (KR) .................. 10-2013-0044823

(51) Int. Cl.
H01M 2/10  (2006.01)
H01M 10/42  (2006.01)

(52) U.S. Cl.
CPC .......... *H01M 2/1072* (2013.01); *H01M 2/1077* (2013.01); *H01M 2/1094* (2013.01); *H01M 10/425* (2013.01); *H01M 2/1016* (2013.01); *H01M 2/1022* (2013.01); *H01M 2220/20* (2013.01)

(58) Field of Classification Search
None
See application file for complete search history.

(56) References Cited

U.S. PATENT DOCUMENTS

| | | |
|---|---|---|
| 2008/0050645 A1 | 2/2008 | Kai et al. |
| 2009/0305119 A1 | 12/2009 | Kim |
| 2011/0104519 A1 | 5/2011 | Ahn |
| 2012/0301747 A1 | 11/2012 | Han et al. |

FOREIGN PATENT DOCUMENTS

| | | |
|---|---|---|
| DE | 10 2008 010 808 A1 | 8/2009 |
| EP | 1 030 388 A1 | 8/2000 |
| EP | 2 290 731 A1 | 3/2011 |
| KR | 10-2009-0127702 A | 12/2009 |
| KR | 10-2011-0047636 A | 5/2011 |
| KR | 10-2011-0066774 A | 6/2011 |
| WO | WO 2008/001022 A1 | 1/2008 |
| WO | WO 2009/103466 A1 | 8/2009 |
| WO | WO 2010/056750 A2 | 5/2010 |

OTHER PUBLICATIONS

EPO Search Report dated Jun. 5, 2014, for corresponding European Patent application 14164333.8, (11 pages).

*Primary Examiner* — Miriam Stagg
*Assistant Examiner* — Carmen Lyles-Irving
(74) *Attorney, Agent, or Firm* — Lewis Roca Rothgerber Christie LLP

(57) ABSTRACT

A battery pack includes a plurality of battery modules; a housing accommodating the plurality of battery modules therein, and having an opened top; a controller on the plurality of battery modules inside the housing; and an isolation portion located between the plurality of battery modules and the controller.

10 Claims, 5 Drawing Sheets

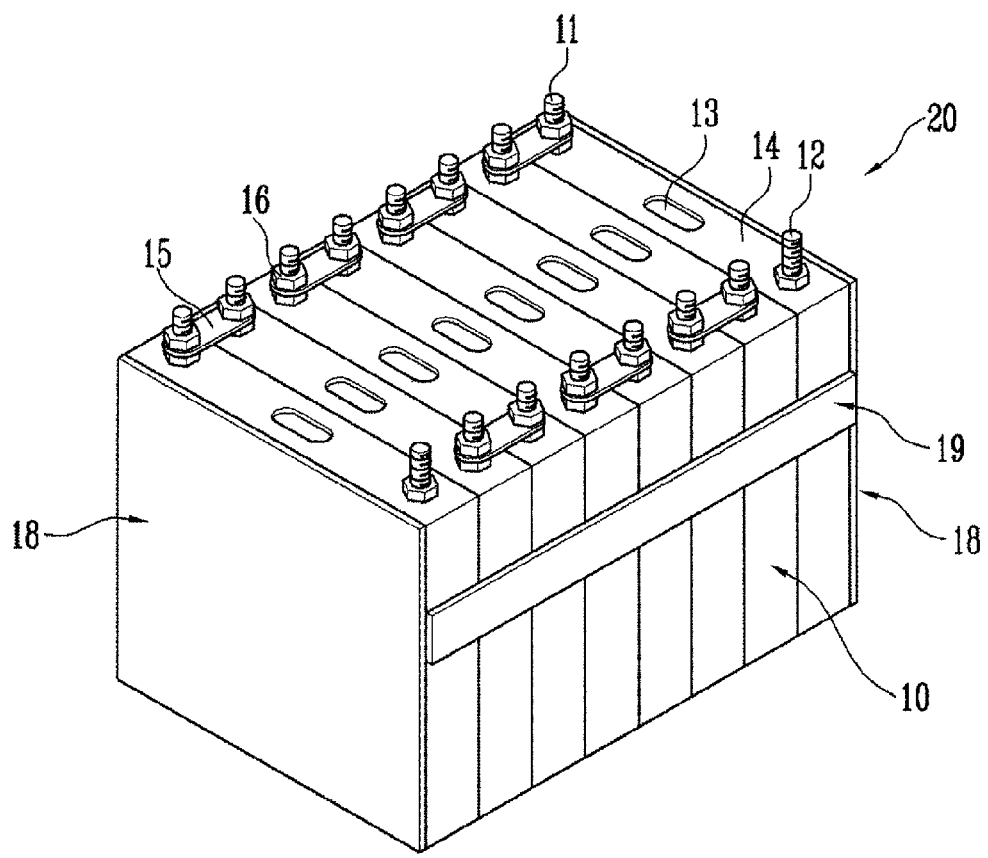

BATTERY PACK

CROSS-REFERENCE TO RELATED APPLICATION

This application claims priority to and the benefit of Korean Patent Application No. 10-2013-0044823, filed on Apr. 23, 2013, in the Korean Intellectual Property Office, the entire contents of which are incorporated herein by reference in their entirety.

BACKGROUND

1. Field

An aspect of the present invention relates to a battery pack.

2. Description of the Related Art

In general, battery cells are used as energy sources for mobile devices, electric vehicles, hybrid vehicles and the like. The shape of the battery cell may be different depending on the type of external device to which the battery cell is applied.

A compact mobile device such as a cellular phone can be operated with the power and capacity of a single battery cell. However, when long-time driving and high-power driving are required in an electric vehicle or hybrid vehicle which consumes a large amount of power, a large-capacity battery module is configured by electrically connecting a plurality of battery cells in order to increase power and capacity. The output voltage or output current of the battery module may be increased according to the number of battery cells built in the battery module. In addition, a battery pack may be configured by electrically connecting such battery modules.

SUMMARY

Embodiments provide a battery pack in which an isolation portion is formed between a plurality of battery modules and a controller so that the plurality of battery modules and the controller are isolated from each other in the battery pack, thereby improving the safety of the battery pack in a dangerous situation.

According to an aspect of the present invention, there is provided a battery pack, including: a plurality of battery modules; a housing accommodating the plurality of battery modules therein, and having an opened top; and a controller formed above the plurality of battery modules inside the housing, wherein an isolation portion is further formed between the plurality of battery modules and the controller.

The isolation portion may include a bottom surface and a side surface extended toward the top along the inner surface of the housing from the end portion of the bottom surface, so as to accommodate the controller therein.

A first flange portion vertically bent toward the outside of the housing may be formed at an upper end of the housing, and a second flange portion vertically bent toward the outside of the isolation portion may be formed at an upper end of the side surface of the isolation portion. The second flange portion may be mounted on the first flange portion.

At least one first hole may be formed in the first flange portion, and at least one second hole may be formed in the second flange portion, corresponding to the first hole. The first and second holes may be fastened by a first fastening member.

At least one extending portion extended toward the outside of the housing may be formed in one region of the first flange portion of the housing.

The battery pack may further include a housing cover covering the top of the housing.

At least one third hole may be formed in the extending portion, and at least one fourth hole may be formed in the housing cover, corresponding to the third hole. The third and fourth holes may be fastened by a second fastening member.

A through-hole through which wires for electrically connecting the plurality of battery modules to the controller pass may be formed in the isolation portion.

The isolation portion may be formed of an insulative material.

The isolation portion may be formed of at least one selected from the group consisting of polyethylene, polypropylene and polycarbonate.

The controller may include a battery control unit (BCU), a battery management system (BMS) and a battery disconnect unit (BDU).

At least one guide member formed between the plurality of battery modules may be further formed inside the housing.

According to the present invention, an isolation portion is formed between a plurality of battery modules and a controller so that the plurality of battery modules and the controller are isolated from each other in the battery pack, thereby improving the safety of the battery pack in a dangerous situation.

Further, a plurality of battery module portions that are portions at which cooling is required and a controller that is a portion at which cooling is not required are separately accommodated in the battery pack, thereby improving the cooling efficiency of the battery pack.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 7 is a perspective view showing the battery module according to the embodiment of the present invention.

DETAILED DESCRIPTION

Figure 1:
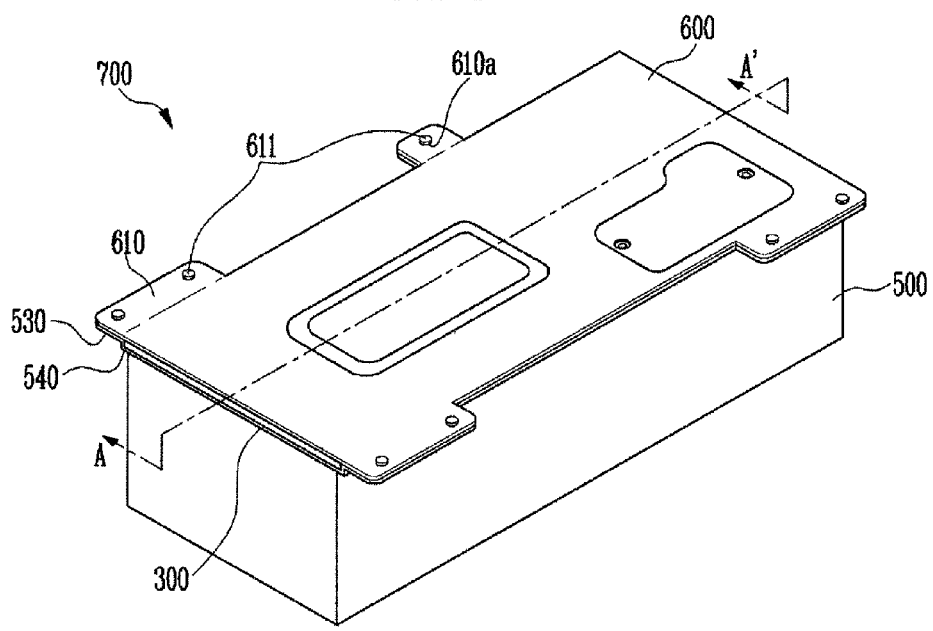
FIG. 1 is a perspective view showing a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

FIG. 1 is a perspective view showing a battery pack according to an embodiment of the present invention.

Referring to FIG. 1, the battery pack 700 according to this embodiment includes a housing 500 having an opened top and a housing cover 600 covering the opened top of the housing 500. A plurality of battery modules 100 (see FIG. 4) are accommodated inside the housing 500, and a controller 400 (see FIG. 3) is formed above the plurality of battery modules 100. In this case, an isolation portion 300 (see FIG. 3) is further formed between the plurality of battery modules 100 and the controller 400.

The isolation portion 300 is positioned between the plurality of battery modules 100 and the controller 400, thereby improving the safety of the battery pack in a dangerous situation. The isolation portion will be described in detail with reference to the following drawings.

In FIG. 1, a first flange portion 540 vertically bent toward the outside of the housing 500 at an upper end of the housing 500, and at least one extending portion 530 extended toward the outside is formed in one region of the first flange portion 540. The housing cover 600 is formed along the outer circumference of an upper surface of the housing 500. In this case, at least one third hole 530a (see FIG. 4) is formed in the extending portion 530 of the housing 500, and at least one fourth hole 610a is formed in the housing cover 600, corresponding to the third hole 530a, so that the third and fourth holes 530a and 610a can be fastened by a second fastening member 611. Accordingly, the housing 500 and the housing cover 600 can maintain a state in which they are coupled to each other.

Figure 2:
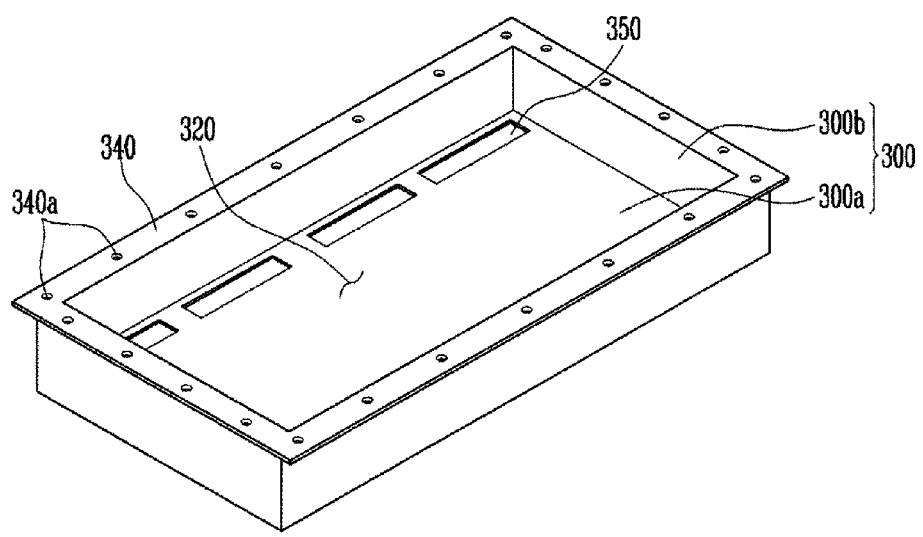
FIG. 2 is a perspective view showing an isolation portion according to the embodiment of the present invention.

FIG. 2 is a perspective view showing the isolation portion according to the embodiment of the present invention.

Referring to FIG. 2, the isolation portion 300 is formed between the controller 400 (see FIG. 3) and the plurality of battery modules 100 (see FIG. 4) accommodated inside the housing 500 (see FIG. 1). The isolation portion 300 includes a bottom surface 300a and a side surface 300b extended toward the top along the inner surface of the housing 500 from the end portion of the bottom surface 300a. Accordingly, a space portion or cavity 320 capable of accommodating the controller therein can be formed in the isolation portion 300.

A second flange portion 340 vertically bent toward the outside of the isolation portion 300 is formed at an upper end of the side surface 300b of the isolation portion 300. The second flange portion 340 may be mounted on the first flange portion 540 (see FIG. 1) of the housing 500. At least one first hole 540a (see FIG. 4) is formed in the first flange portion 540, and at least one second hole 340a is formed in the second flange portion 340, corresponding to the first hole 540a. Accordingly, the first and second holes 540a and 340a can be fastened by a first fastening member 541.

A through-hole 350 through which wires for electrically connecting the plurality of battery modules 100 to the controller 400 pass may be further formed in the isolation portion 300. Accordingly, the plurality of battery modules 100 and the controller 400 are spatially separated from each other. Although the isolation portion 300 is accommodated inside the housing 500, it is possible to maintain the electrical connection between the battery modules 100 and the controller 400.

The isolation portion 300 may be formed of an insulative material. In one embodiment, the isolation portion 300 may be formed of at least one selected from the group consisting of polyethylene, polypropylene and polycarbonate.

Figure 3:
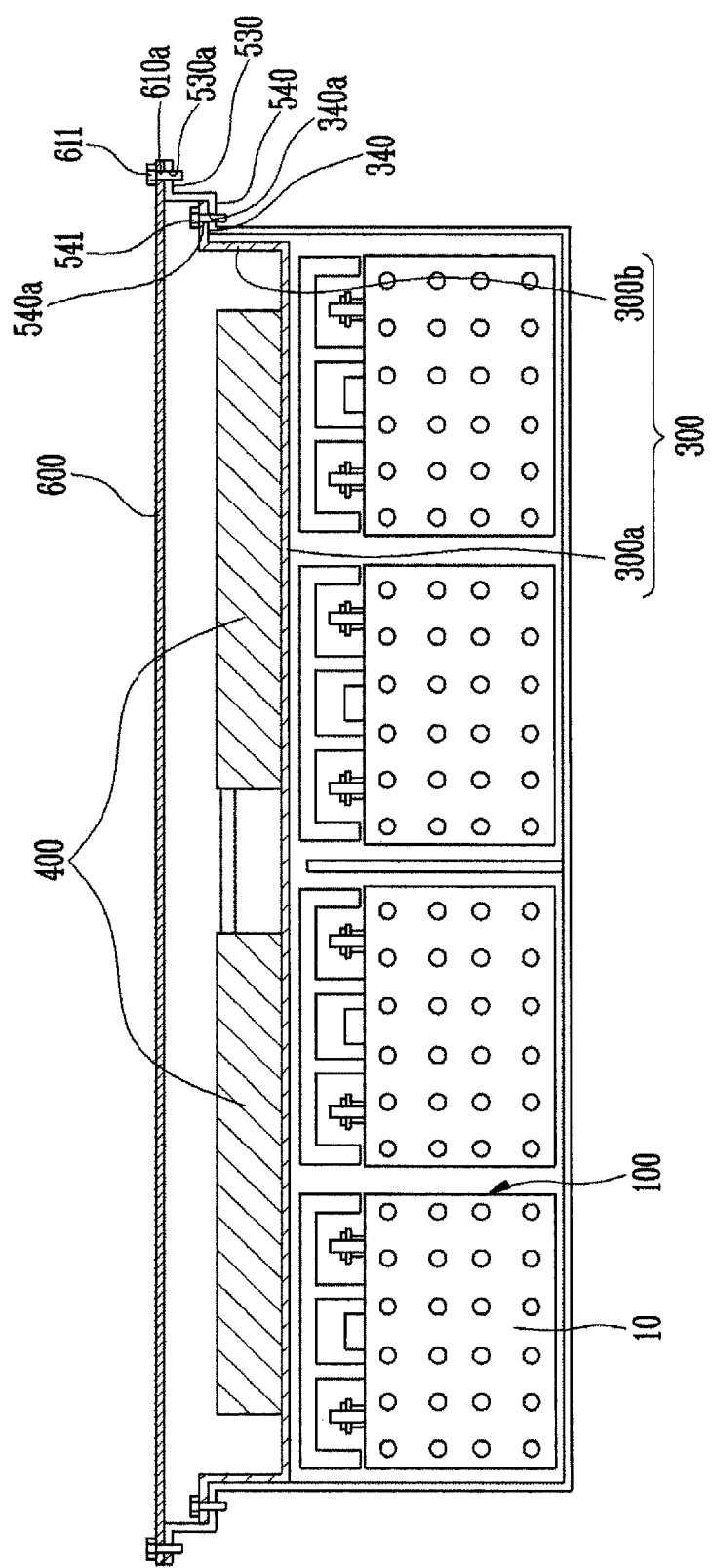
FIG. 3 is a sectional view taken along line A-A' of FIG. 1.

FIG. 3 is a sectional view taken along line A-A' of FIG. 1.

Referring to FIG. 3, the battery pack 700 according to this embodiment include a plurality of battery modules 100, a housing 500 accommodating the plurality of battery modules 100 therein and having an opened top, and a controller 400 formed above the plurality of battery modules 100 inside the housing 500. The battery pack 700 further includes an isolation portion 300 formed between the plurality of battery modules 100 and the controller 400.

In one embodiment, the isolation portion 300 includes a bottom surface 300a and a side surface 300b extended toward the top along the inner surface of the housing 500 from the end portion of the bottom surface 300. The isolation portion 300 may accommodate the controller 400 therein.

As shown, a first flange portion 540 vertically bent toward the outside of the housing 500 is formed at an upper end of the housing 500, and a second flange portion 340 vertically bent toward the outside of the isolation portion 300 is formed at an upper end of the side surface 300b of the isolation portion 300. The second flange portion 340 is mounted on the first flange portion 540. In this case, at least one first hole 540a is formed in the first flange portion 540, and at least one second hole 340a is formed in the second flange portion 340, corresponding to the first hole 540a so that the first and second holes 540a and 340a are fastened by a first fastening member 541. Accordingly, the housing 500 and the isolation portion 300 can be easily fastened to each other.

At least one extending portion 530 extended toward the outside of the housing 500 is further formed in one region of the first flange portion 540 of the housing 500. The extending portion 530 is a region coupled to the housing cover 600. At least one third hole 530a is formed in the extending portion 530, and at least one fourth hole 610a is formed in the housing cover 600, corresponding to the third hole 530a, so that the third and fourth holes 530a and 610a can be fastened by a second fastening member 611.

Figure 4:
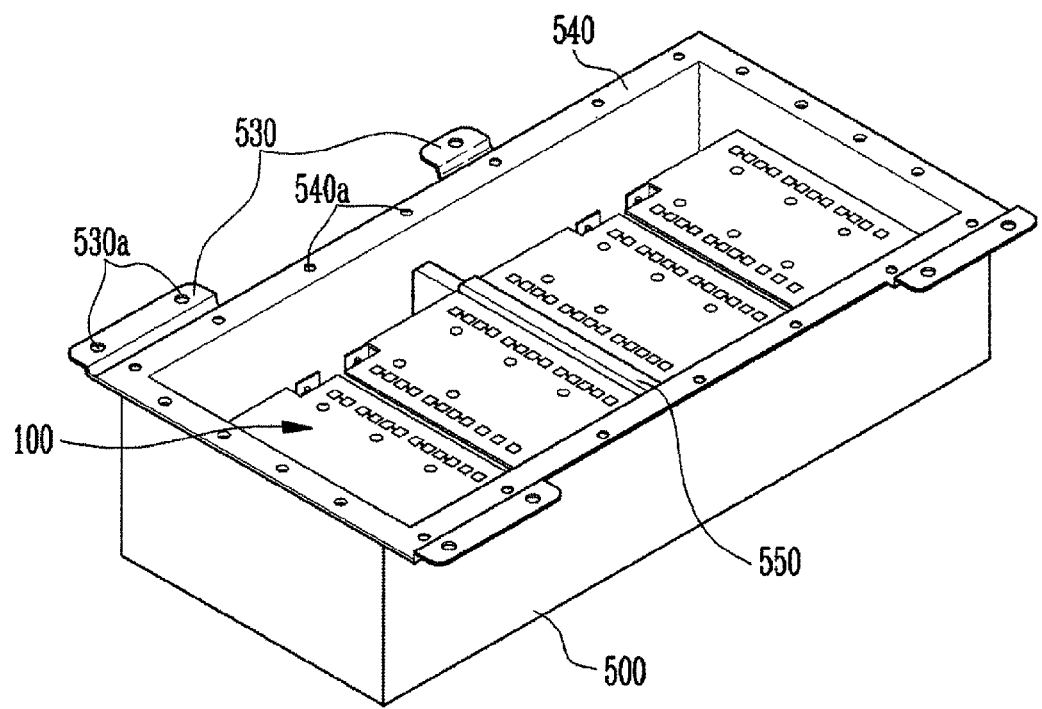
FIG. 4 is a perspective view showing a state in which a plurality of battery modules are accommodated in a housing according to the embodiment of the present invention.

FIG. 4 is a perspective view showing a state in which the plurality of battery modules are accommodated in the housing according to the embodiment of the present invention.

Referring to FIG. 4, the plurality of battery modules 100 are accommodated in the housing 500. The first flange portion 540 vertically bent toward the outside of the housing 500 is formed at the upper end of the housing 500. The at least one first hole 540a is formed in the first flange portion 540. The first hole 540a can be fastened to the second hole 340a of the second flange portion 340 of the isolation portion (see FIG. 5).

The plurality of battery modules 100 in the housing 500 are arranged so that side surfaces of battery cells 10 (see FIG. 3) face each other, and at least one guide member 550 may be formed between the battery modules 100. The guide member 550 guides the position of the battery module 100. In this embodiment, the guide member 550 is formed between two battery modules 100 positioned in the middle of the housing 500, but it is apparent that the guide member 550 may be provided between the respective battery modules 100 accommodated in the housing 500.

Because the guide member 550 guides the mounting position of the battery module 100, it is possible to effectively perform the alignment of the plurality of battery modules 100, thereby improving the production efficiency of the battery pack 700 (see FIG. 1).

Figure 5:
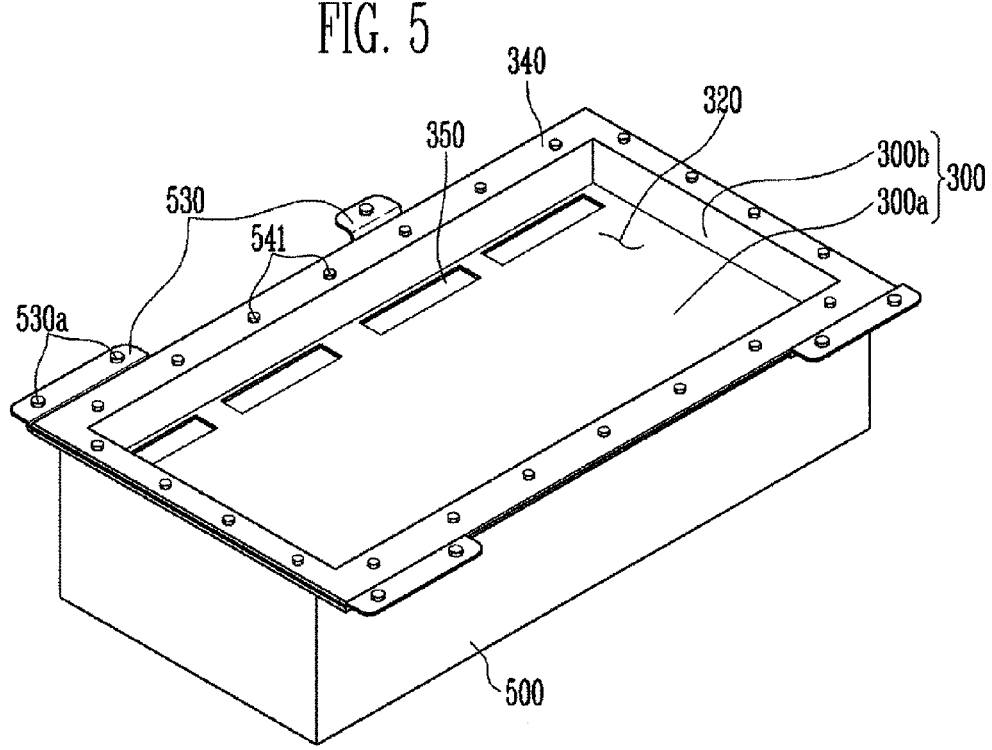
FIG. 5 is a perspective view showing a state in which the isolation portion is accommodated in the housing according to the embodiment of the present invention.

FIG. 5 is a perspective view showing a state in which the isolation portion is accommodated in the housing according to the embodiment of the present invention.

Referring to FIG. 5, the isolation portion 300 is mounted above a plurality of battery modules 100 when the plurality of battery modules 100 are accommodated in the housing 500. The isolation portion 300 includes a bottom surface 300a and a side surface 300b extended toward the top along the inner surface of the housing 500 from the end portion of the bottom surface 300a. The isolation portion 300 configured as described above may accommodate a controller 400 (see FIG. 6) therein.

The second flange portion 340 vertically bent toward the outside of the isolation portion 300 is formed at the upper end of the side surface 300b of the isolation portion 300. The second flange portion 340 is mounted on the first flange portion 540. As described above, the first hole 540a of the first flange portion 540 and the second hole 340a of the second flange portion 340 are fastened by the first fastening member 541, so that the housing 500 and the isolation portion 300 can be coupled to each other.

At least one through-hole 350 through which wires for electrically connecting the plurality of battery modules 100 (see FIG. 4) to the controller 400 pass may be formed in the bottom surface 300a of the isolation portion 300. Accordingly, the plurality of battery modules 100 and the controller 400 can be easily electrically connected to each other by the wires.

The isolation portion 300 may be formed of an insulative material. For example, the isolation portion 300 may be formed of at least one selected from the group consisting of polyethylene, polypropylene and polycarbonate.

Figure 6:
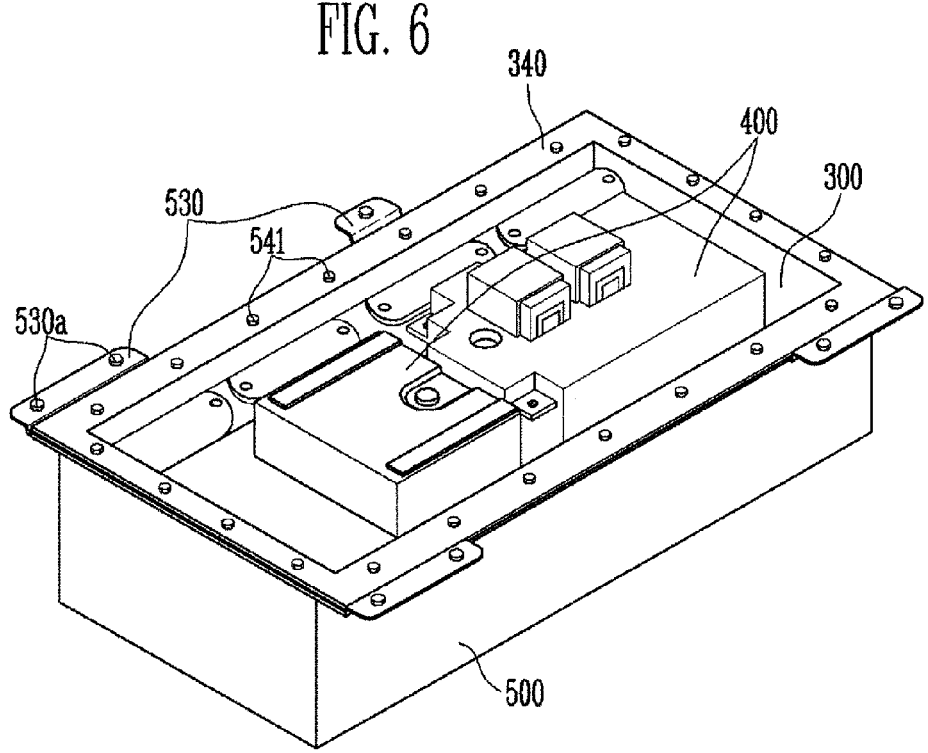
FIG. 6 is a perspective view showing in a state in which a controller is accommodated in the isolation portion according to the embodiment of the present invention.

FIG. 6 is a perspective view showing in a state in which the controller is accommodated in the isolation portion according to the embodiment of the present invention.

Referring to FIG. 6, in the battery pack according to this embodiment, the controller 400 is accommodated in the isolation portion 300. In other words, the plurality of battery modules 100 are accommodated in the housing 500, and the isolation portion 300 is then mounted above the plurality of battery modules 300. Subsequently, the controller 400 is positioned on the isolation portion 300. In this case, the controller 400 may be fixed to the bottom surface 300a of the isolation portion 300.

Here, the controller 400 may include a battery control unit (BCU), a battery management system (BMS), a battery disconnect unit (BDU), etc., which can control power and the like of the battery pack according to the status of the battery pack.

As described above, according to one embodiment of the present invention, a lower side inside the housing 500 at which the plurality of battery modules 100 are positioned and an upper side inside the housing 500 at which the controller 400 is positioned are structurally separated from each other by the isolation portion 300. Accordingly, it is possible to improve the electrical safety of the battery pack and to further improve the cooling efficiency of the battery pack by separating the battery modules 100 necessary for cooling from the controller 400 unnecessary for cooling.

Further, in a case where the accommodating space of the battery pack is narrow due to a narrow interval between both wheels of a vehicle, such as that the battery pack is positioned between both the wheels when the battery pack is applied to the vehicle, the controller is positioned in a space above the battery modules, thereby improving the space efficiency of the battery pack.

FIG. 7 is a perspective view showing the battery module according to the embodiment of the present invention.

Referring to FIG. 7, in the battery module 100 according to this embodiment, the state in which a plurality of battery modules 100 are connected to one another may be used as a set in order to obtain high power. Each of the battery modules 100 is formed by arranging a plurality of battery cells 10 in one direction. The battery cells 10 are electrically connected to one another. Each battery cell may include a battery case having one opened surface, and an electrode assembly and an electrolyte, which are accommodated in the battery case.

The electrode assembly and the electrolyte generate energy through an electrochemical reaction therebetween, and the battery case is hermetically sealed with a cap plate 14. The cap plate 14 may be provided with terminal portions 11 and 12 and a vent portion 13. The terminal portions 11 and 12 may include positive and negative electrode terminals 11 and 12 having different polarities. The vent portion 13 is a safety means of the battery cell 10 and acts as a passage through which gas generated inside the battery cell 10 is exhausted to the outside of the battery cell 10. The positive and negative electrode terminals 11 and 12 of neighboring battery cells 10 may be electrically connected to each other through a bus-bar 15. The bus-bar 15 may be fixed to the positive and negative electrode terminals 11 and 12, using a member such as a nut 16.

The battery module is configured by aligning a plurality of battery cells 10. In this case, one or more plates 18 and 19 may be used to fix the alignment of the battery cells 10. The plates 18 and 19 may include a pair of end plates 18 provided opposite to each other so as to face wide surfaces of the battery cells 10, and a side plate 19 connected to the end plates 18 so as to be adjacent to side surfaces of the battery cells 10. The plates 18 and 19 are used to fix the plurality of battery cells 10, and may be variously modified according to the design of the battery module 100.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack comprising:
   a plurality of battery modules;
   a housing accommodating the plurality of battery modules therein the housing having an integral first flange extending around an entire perimeter thereof;
   a controller on the plurality of battery modules inside the housing; and
   an isolation portion located between the plurality of battery modules and the controller, the isolation portion comprising a bottom surface and side surfaces protruding from an edge of the bottom surface and away from the battery modules along an inner surface of the housing to enclose the controller therein, wherein the side surfaces have a second flange extending around an entire periphery of the isolation portion and wherein the second flange directly contacts the first flange.

2. The battery pack of claim 1, wherein at least one first hole is formed in the first flange, and at least one second hole is formed in the second flange and generally corresponding to the first hole, and wherein the first and second holes accommodate a first fastening member.

3. The battery pack of claim 1, wherein at least one extending portion extending toward a periphery of the housing protrudes from the first flange of the housing.

4. The battery pack of claim 3, further comprising a housing cover covering the housing.

5. The battery pack of claim 4, wherein at least one third hole is formed in the extending portion, and at least one fourth hole is formed in the housing cover generally corresponding to the third hole, and wherein the third and fourth holes accommodate a second fastening member.

6. The battery pack of claim 1, wherein a through-hole through which wires for electrically connecting the plurality of battery modules to the controller pass is formed in the isolation portion.

7. The battery pack of claim 1, wherein the isolation portion comprises an insulative material.

8. The battery pack of claim 7, wherein the isolation portion comprises at least one selected from the group consisting of polyethylene, polypropylene and polycarbonate.

9. The battery pack of claim 1, wherein the controller comprises a battery control unit (BCU), a battery management system (BMS) and a battery disconnect unit (BDU).

10. The battery pack of claim 1, wherein at least one guide member is located between the plurality of battery modules inside the housing.

* * * * *